United States Patent
Yi et al.

(10) Patent No.: US 9,432,800 B1
(45) Date of Patent: Aug. 30, 2016

(54) WIRELESS NEAR FIELD COMMUNICATION SYSTEM

(71) Applicants: Ge Yi, San Ramon, CA (US); Jinwen Wang, Pleasanton, CA (US); Dujiang Wan, Fremont, CA (US); Shaoping Li, San Ramon, CA (US)

(72) Inventors: Ge Yi, San Ramon, CA (US); Jinwen Wang, Pleasanton, CA (US); Dujiang Wan, Fremont, CA (US); Shaoping Li, San Ramon, CA (US)

(*) Notice: Subject to any disclaimer, the term of this patent is extended or adjusted under 35 U.S.C. 154(b) by 0 days.

(21) Appl. No.: 14/680,069

(22) Filed: Apr. 7, 2015

(51) Int. Cl.
*H04B 5/00* (2006.01)
*H04W 4/00* (2009.01)

(52) U.S. Cl.
CPC .................... *H04W 4/008* (2013.01)

(58) Field of Classification Search
CPC ............... G01N 27/745; G01N 27/9033
USPC ................................ 455/41.1–41.3
See application file for complete search history.

(56) References Cited

U.S. PATENT DOCUMENTS

| | | | | |
|---|---|---|---|---|
| 2002/0163382 A1* | 11/2002 | Soikkeli | ............... | H03F 3/72 330/51 |
| 2005/0064814 A1* | 3/2005 | Matsuo | ............... | G06K 7/10237 455/41.1 |
| 2007/0005368 A1* | 1/2007 | Chutorash | ............... | B60R 16/0373 704/275 |
| 2007/0008237 A1* | 1/2007 | Mehta | ............... | H01Q 1/38 343/895 |
| 2007/0184785 A1* | 8/2007 | Yoshida | ............... | H04B 7/10 455/73 |
| 2008/0009321 A1* | 1/2008 | Sayeed | ............... | H01Q 3/2605 455/562.1 |
| 2008/0299904 A1* | 12/2008 | Yi | ............... | H01Q 7/06 455/41.1 |
| 2012/0040665 A1* | 2/2012 | Liu | ............... | H04W 4/008 455/426.1 |
| 2012/0126630 A1* | 5/2012 | Jin | ............... | H01F 17/0006 307/104 |
| 2015/0249484 A1* | 9/2015 | Mach | ............... | H02J 5/00 307/104 |

* cited by examiner

*Primary Examiner* — Ayodeji Ayotunde
*Assistant Examiner* — Max Mathew

(57) ABSTRACT

A wireless magnetic field communication system working within the range of less than 1.5 m without induction induced interference during listening mode is proposed. The system comprises at least a transmitter and a receiver. Several novel transmitter designs using either active-connection-control solenoid or spin-orbit torque (SOT) based patterned thin film element(s) are proposed. The system has intrinsic high data security level due to its limited working range, as well as large data transfer rate. The system is suitable to establish a temporary off-the grid magnetic field communication network. It also provides a new data communication approach among modules instead of data cable in industry equipment. The system can be used as a stand-alone or built-in system for communication between devices or modularized components of a system.

19 Claims, 15 Drawing Sheets

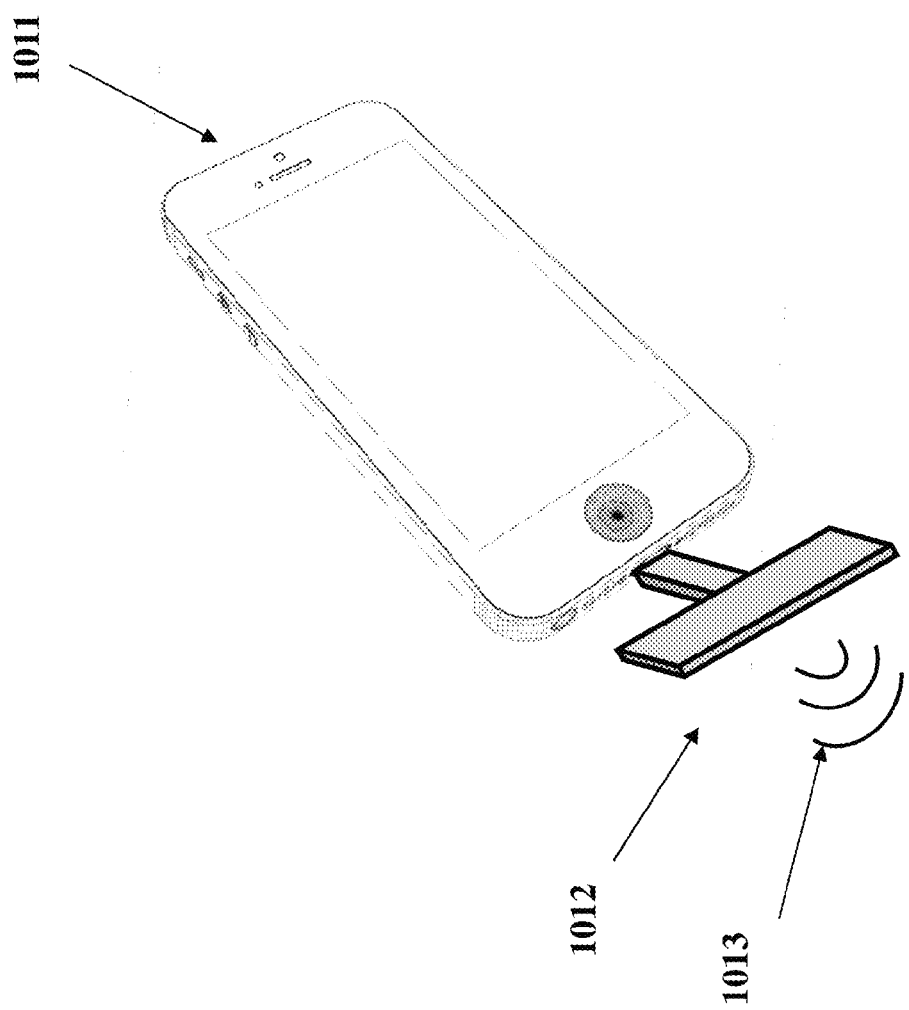

WIRELESS NEAR FIELD COMMUNICATION SYSTEM

RELATED APPLICATIONS

The present application claims of the priority benefit of U.S. Patent Application 62/038,208 filed on Aug. 16, 2014 as provisional patent application, entitled "WIRELESS NEAR FIELD COMMUNICATION SYSTEM", which is incorporated herein by reference.

FIELD OF INVENTION

The invention is related to near field communication system. Particularly, the wireless communication system has high data rate in a distance between the pairing systems below 1.5 meters.

BACKGROUND ART

Data exchange through public cellphone network, WiFi network or personal cloud is convenient, however, there is huge data leakage concern. It is hard for RFID-based NFC devices to establish a secured temporary personal area network to exchange a large amount of data between device to multiple devices (D2MD) or peer to multiple peers (P2MP) due to either its low data rate, or limited bandwidth, or incapable of supporting D2MD or P2MP mode. Although RFID-enabled-pairing Bluetooth or WiFi Direct devices provide high data rate, they are incapable of D2MD and P2MP data exchange and vulnerable to be hacked. Although WiFi hotspot provides D2MD and P2MP data exchange mode, it is not secured due to the long propagating range. Therefore, developing a secured near field communication system with high data rate is very useful for safely exchanging a large amount of data under D2MD and P2MP modes.

Developing such a new secured near field communication system with high data rate has various industrial applications such as modular component design for robots, personalized mobile phone. The design and overall cost of the industry automation equipment particularly the vacuum tools, will be greatly simplified and reduced, respectively, by the near field communication system to link the components without data cable.

Such new secured near field communication system can be established by wireless magnetic field communication (MFC) technology. One of near field wireless MFC methods has been proposed previously by G. Yi et. al, US 2008/0299904A1 "wireless communication system". However, there are some issues associated with the design in the above patent: 1) within pairing system, the solenoid closed to receiver/reader during signal reception can generate interfering magnetic field due to Lenz' law to poison the received signal. To eliminate this interference is challenging; 2) such system has limited data rate due to high impedance (particular the inductance limited) of the solenoid-base design. So far, the demonstrated highest data rate is close to 4 Gb/sec or 4 Gfc/sec (fc means flux changes).

In this disclosure, we propose several near field magnetic field communication (NF-MFC) solutions to enable a large amount of data exchange securely without the issues mentioned above.

SUMMARY OF THE INVENTION

In this invention, a new class of near field magnetic field communication (NF-MFC) system is disclosed. The system comprises wireless magnetic field communication hardware subsystem and support software.

The software is used to communicate between NF-MFC system and the mothership devices with capability of filtering undesired data. The software system is a security gate to download data from remote cloud devices or upload data to online system.

The core of this NF-MFC system is a transceiver comprising a transmitter made by either an active control solenoid with a high permeability magnetic core or spin orbit torque (SOT) based pattern magnetic elements and a receiver made of solid state magnetic field sensor. They are all manufactured by micro fabrication methods on various substrates. One choice of the substrate is Si wafer with built-in electronic circuit of transceiver control system (System-On-Chip, SOC). The electronics for the transceiver is also able to be integrated with transceiver through System-In-Package (SIP). The magnetic field broadcasted by the transmitter is modularized by the coded digital information. The magnetic field receiver picks up the modularized magnetic field signal, and the useful information is obtained from the selected signal by the decoding electronic circuitry system. The magnetic sensor can be magnetoresistive (MR) technology (AMR, or GMR, or TMR), or Hall sensor, or magnetic impedance (MI) sensor. For any given time, the communication between a pair of transceivers is unidirectional and unilateral. The system with multiple pairs of transceivers is capable of bidirectional communication. The solenoid design of transceiver has been demonstrated by the hard disk industry with data rate up to 4 Gbit/sec. Meanwhile the SOT based pattern magnetic element can be flipped by the SOT effect within tens of picoseconds, thus the data rate of SOT based transceiver is able to reach tens of GHz (or tens of Gb/sec).

The SOT design eliminates the inductance concern and enables to make a large array structure to release alignment requirement for the system, nevertheless, the SOT design is more suitable for a short distance (<10 cm) communication. On the other hand, the active solenoid control is appropriate for the propagation distance up to 1.5 meter. Such a short casting distance provides capability of data security. Upon the NF-MFC system, a secured off-the-grid multiple joint connection (Table Network™ or Table Cloud™) is able to be established temporarily for data exchange among friends in a private or public environment. The temporary off-the-grid wireless magnetic network can be extended further for data exchange in a party with the assistance of the technology of Stone Skipping Network™ or Skipping Stone Network™.

As used herein, the term "or" may be construed in either an inclusive or exclusive sense. Similarly, the term "exemplary" is construed merely to mean an example of something or an exemplar and not necessarily a preferred or ideal means of accomplishing a goal. Additionally, although various exemplary embodiments discussed below focus on quality control of professionals, the embodiments are given merely for clarity and disclosure. Alternative embodiments may employ other systems and methods and are considered as being within the scope of the present invention.

BRIEF DESCRIPTION OF THE DRAWINGS

FIG. 1B one embodiment of the applications of current invention/technology—an independent wireless communication system/device, which can be attached on the external and/or communication port of smart phone, or on USB port of desktop, or laptop.

DETAILED DESCRIPTION

The following numerous specific detailed descriptions are set forth to provide a thorough understanding of various embodiment of the present disclosure. It will be apparent to one skilled in the art, however, that these specific details need not be employed to practice various embodiments of the present disclosure. In other instances, well known components or methods have not been described.

Figure 1A:
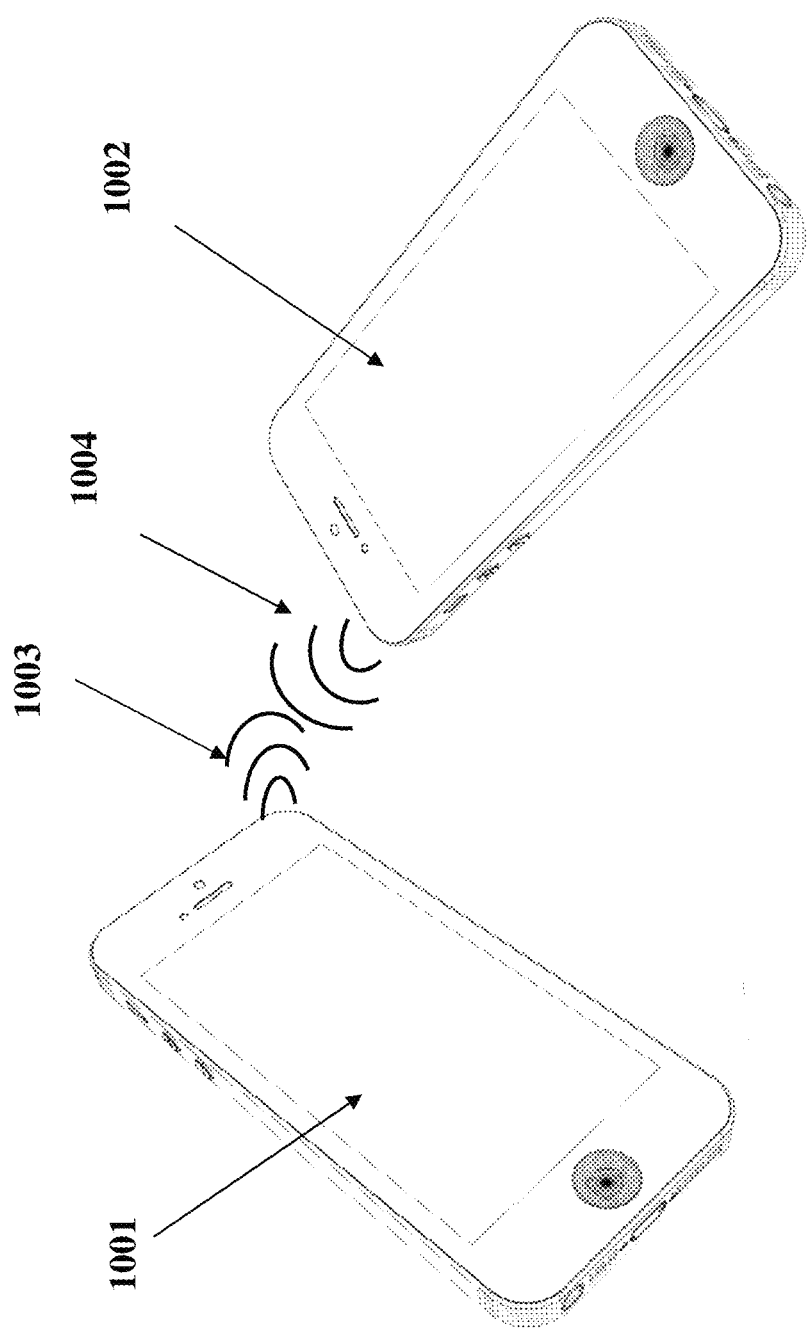
FIG. 1A one embodiment of the application of current invention/technology between the portable devices, in which proposed device is built as embedded device.

FIG. 1A shows one embodiment of the applications of the proposed NF-MFC technology between the portable devices, in which our invented NF-MFC systems as embedded devices are built. In this particular case, two smart phones (1001 and 1002) with built-in devices proposed here is capable of communicating through the magnetic field shown as 1003 and 1004 emitted by the built-in NF-MFC system.

FIG. 1B shows one embodiment of the application of the proposed NF-MFC technology. As shown in FIG. 1B, the independent NF-MFC device 1012 emits magnetic field 1013, through which a bidirectional channel can be established. The device 1012 can be plugged into the mothership devices' communication ports, such as smart phone communication port, USB port or lightning port of desktop, laptop or smart TV, etc. As such, the mothership device 1011, without built-in NF-MFC system as shown in FIG. 1A, can establish data transfer channel with various devices, which either have a built-in NF-MFC system or are attached with an independent NF-MFC system.

Figure 1C:
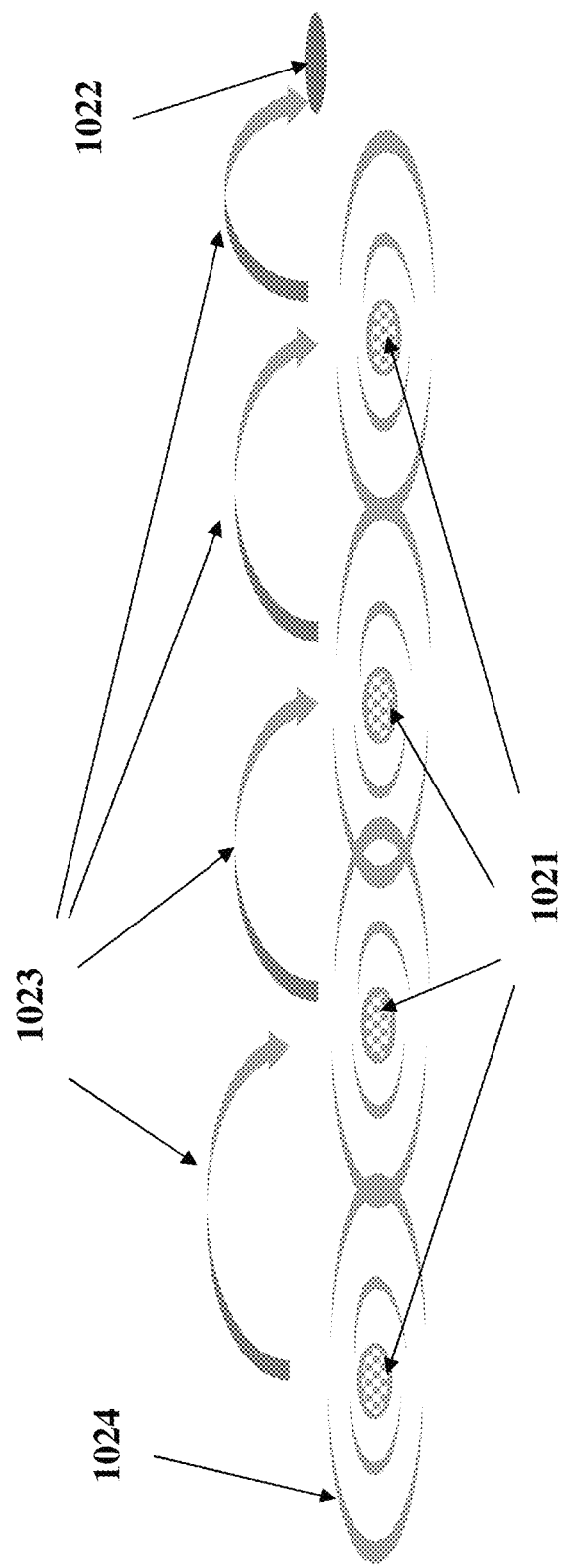
FIG. 1C the concept of Stone Skipping Network™ or Skipping Stone Network™ to establish long distance off-the-grid network via the proposed invention/technology for information transfer from device to device.

FIG. 1C illustrates the concept of Stone Skipping Network™ or Skipping Stone Network™ to establish long distance off-the-grid network via the proposed invention/technology for information transfer from device to device. As shown in FIG. 1C, the devices 1021, which either have a built-in NF-MFC system or are attached with an independent NF-MFC system, are bridged together through magnetic field channel capable of communication between two neighbor devices apart away up to 1.5 meters. The effective working pattern and range 1024 of each device shown in FIG. 1C is similar to the wave centered on the landing position of skipping stone. Data or information 1022 can be transferred from device to device in a long distance through the private channel 1023 without any external communication network such as mobile phone network or WiFi network.

Both the communication network topology and the working distance of the private channel 1023 shown in FIG. 1C are determined by the arrangement of the active devices 1021. When hosts of the active devices are around a table, and the working coverages among the neighbor devices overlap each other, a secured private communication Table Network™ will be established to cover all of the guests. If a portable device or a storage device with a NF-MFC device is at the center of a table, it can act as a device similar as a hotspot of WiFi to establish a Table Cloud™ private network. Such a NF-MFC enabled temporary Table Network™ or Table Cloud™ has intrinsic high security because of its short working distance.

Figure 1D:
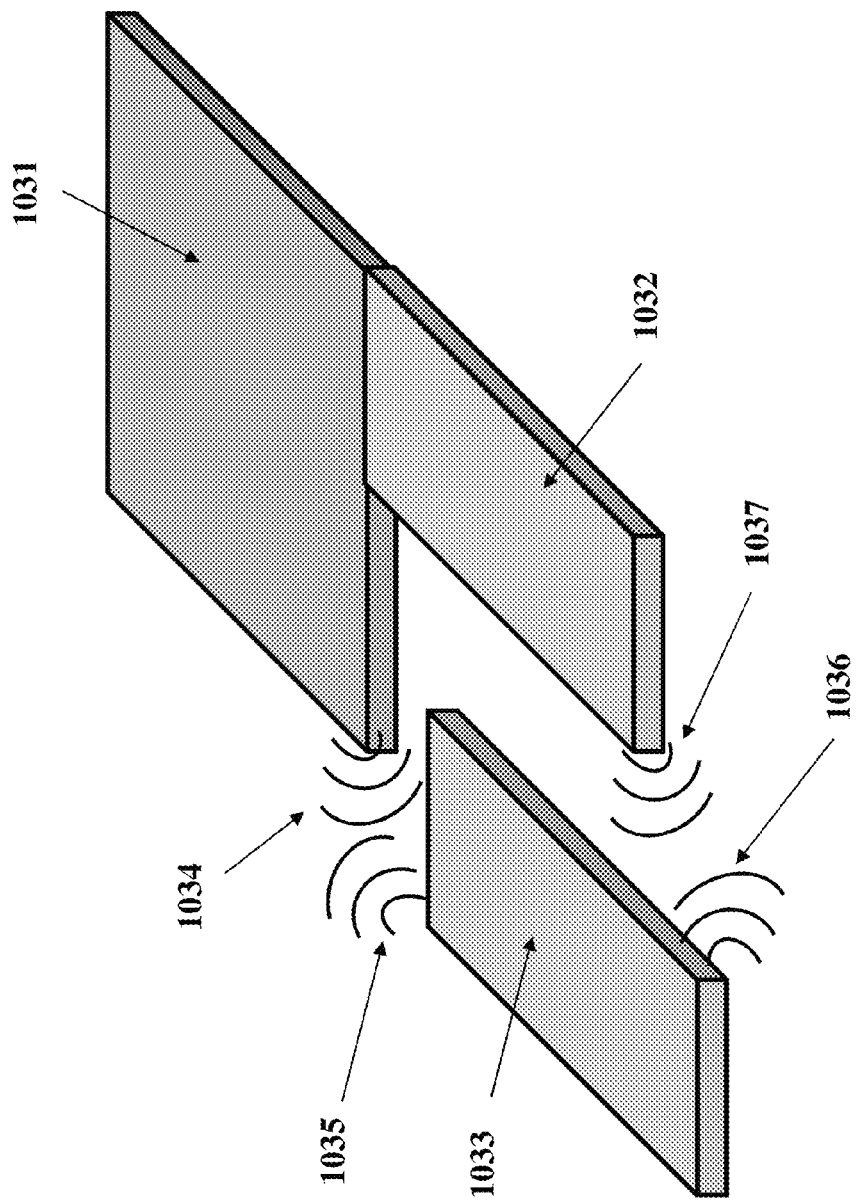
FIG. 1D one of the embodiments of module to module (M2M) (or inter-module) data communication in modularized devices or robots using the proposed technology.

FIG. 1D shows one of the embodiments of module to module (M2M) (inter-module) data communication in modularized devices or robots based on the proposed NF-MFC technology. In this particular case, the system comprises 3 modules, 1031, 1032 and 1033. Modules 1031 and 1032 have built-in NF-MFC system 1034 and 1037, respectively. Module 1033 has two built-in NF-MFC systems of 1035 and 1036. NF-MFC system 1035 is paired with NF-MFC system 1034 working in a very short distance of less than 10 cm to build a communication channel between module 1033 and module 1031. Module 1033 and module 1032 are connected each other via the pair of NF-MFC systems of 1036 and 1037. The undesired magnetic field cross-talk between the NF-MFC pair systems of 1035-1034 and 1036-1037 is automatically filtered by the distance longer than 15 cm between the two pair systems. This is done by design to tune the magnetic field range of the transmitter (magnetic field emitter/generator) and the sensitivity of the receiver (solid magnetic field sensor). Built-in NF-MFC based M2M data communication is a green technology, and will eliminate conventional data cable between the modules, save space and weight, provide freedom to the system designer as well as flexibility to customers, and make maintenance easy. Once the built-in NF-MFC based M2M data communication is used widely in related industries by module manufacturers and standardized, the build of the modularized systems such as cell phones or robots becomes much simpler and more efficient.

Figure 1E:
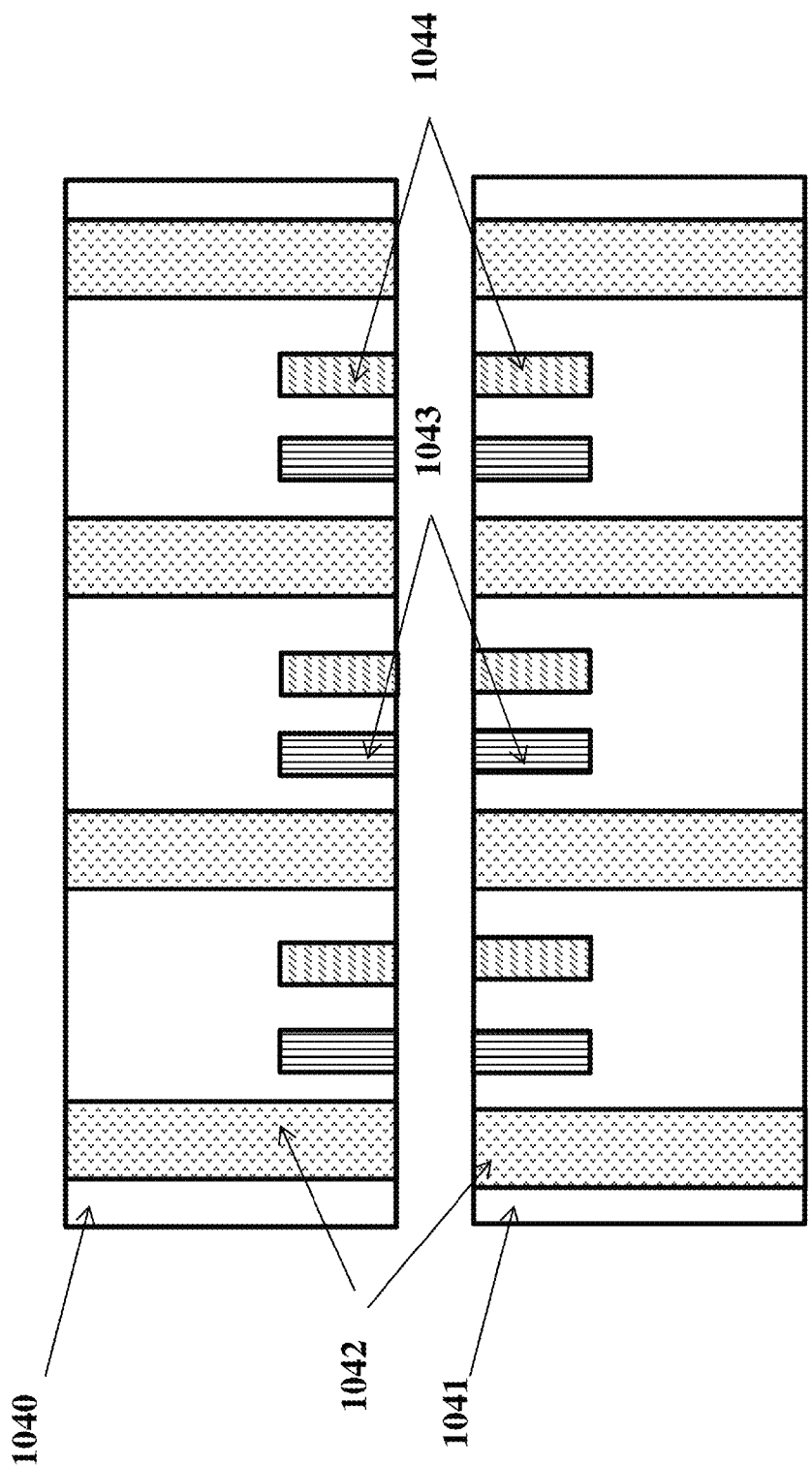
FIG. 1E one embodiment of the proposed device containing three transmitter-receiver pairs for fast data rate and bilateral data transfer at the same time, particularly useful for intra-module wireless low power communications.

FIG. 1E schematically shows one embodiment of the proposed NF-MFC systems containing three transceivers, each of which comprises a transmitter and a receiver, in one device for fast data rate and bidirectional data transfer at the same time, particularly useful for inter-module wireless low power communications. As shown in FIG. 1E, both systems 1040 and 1041 have three transmitters 1043 for magnetic field broadcasting, and three receivers 1044 for magnetic field detection. Every pair of transmitter and receiver forms a NF-MFC based transceiver, and is isolated from its neighbor by the magnetic shield 1042 in order to minimize the magnetic interference between the adjacent transceiver. To further reduce the magnetic interference, different pair of transceivers can be operated at different frequency. The amplitude of the emitted magnetic field (Solenoid transceiver) is modulated by the coded information, or the switch of magnetic field direction (SOT transceiver) is controlled by the coded information. When all the pairs of transceivers send data unidirectional, i.e., from 1040 to 1041, this design can increase data rate three times with a possible data buffer memory. This system is also capable of bi-directional communication in the meantime. FIG. 1E shows a three-independent transceiver design while the system can also have an alternative design with three transmitters and one receiver. The signal captured by the receiver is deconvoluted and decoded by the corresponding electronic system.

Figure 2:
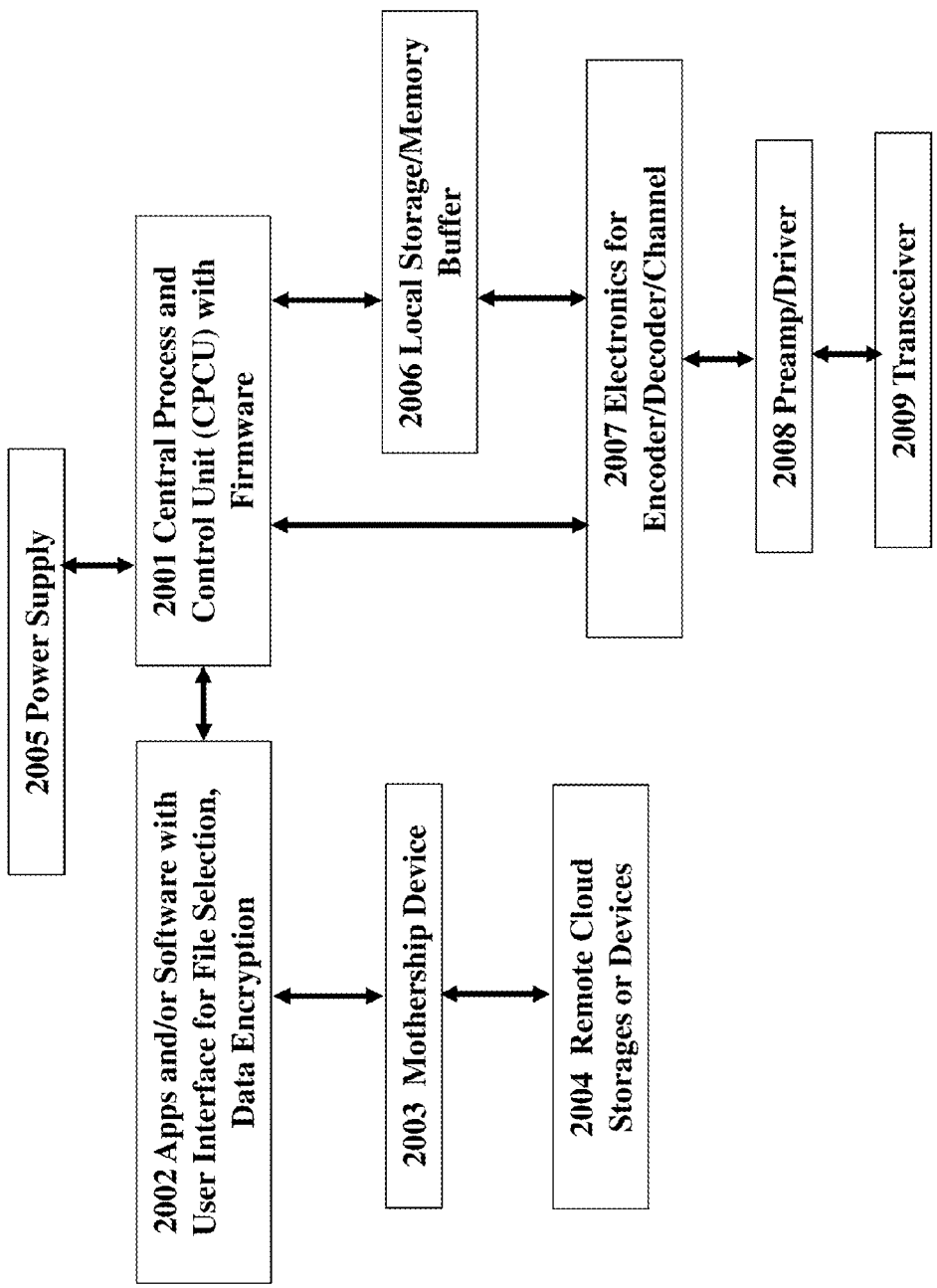
FIG. 2 key components of the proposed independent system as shown in FIG. 1B.

FIG. 2 illustrates the key components of the proposed independent NF-MFC system in FIG. 1B. This system has an electronic Central Process and Control Unit (CPCU) 2001 with its own firmware to coordinate the system components and manipulate the data flow. It is linked to 2002 Apps and Software to facilitate the user interaction through mothership device 2003 for data selection and data encryption. Device 2003 is connected to remote cloud storages or devices 2004. CPCU 2001 is powered by Power Supply 2005. The system has optional local storage/memory buffer 2006. Alternatively, it shares storage and memory buffer with mothership devices 2003 via Apps/Software 2002. The system has 2007 Electronics for Data Encode, Decode and Channel, which communicates with 2008 Preamp/Driver for Transceiver 2009, which is a key invention of this disclosure. The transceiver either purposely emits the coded data through magnetic field broadcasting to nearby free space or senses the magnetic field sent by the pairing system's transmitter.

Figures 3A, 3B:
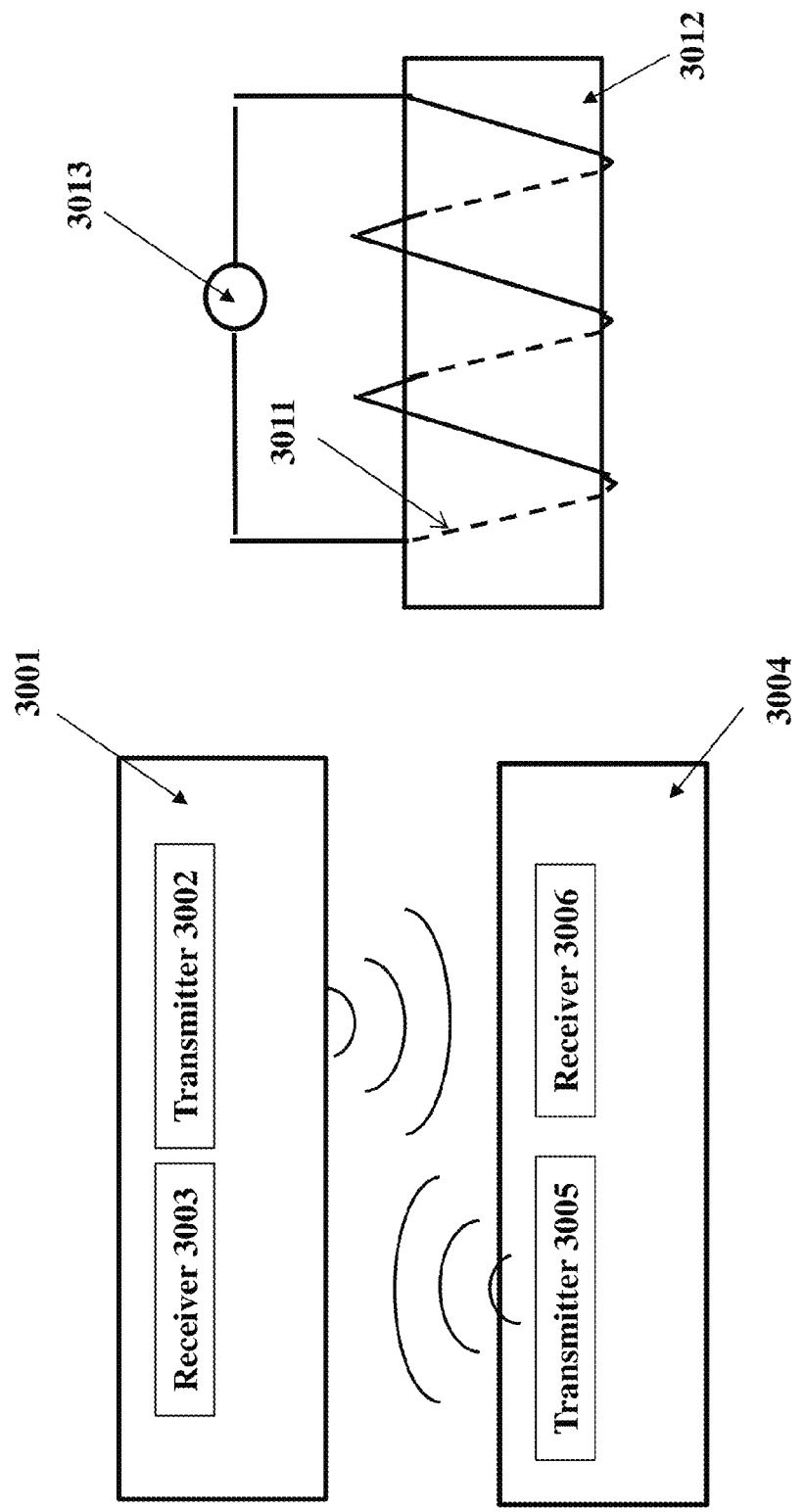
FIG. 3A the prior art of the magnetic communication system in patent disclosure US 2008/0299904 A1.
FIG. 3B the prior art of transmitter design in patent disclosure US 2008/0299904 A1.

FIG. 3A and FIG. 3B are the prior art of the magnetic communication system and its transmitter design in patent disclosure US 2008/0299904 A1. As shown in FIG. 3A, the pairing system 3001 and 3004 in the prior art have their own receiver 3003, 3006 and transmitter 3002 and 3005, respectively. It is designed in such a way that the magnetic field generated by transmitter 3002 is received by 3006, while magnetic field from 3005 is sensed by receiver 3003. As shown in FIG. 3B, the design of the transmitter 3002 and 3005 in FIG. 3A is a typical solenoid with coil 3011 surrounding a soft magnetic core 3012 linked to current driver 3013, which is controlled by control electronics to emit magnetic field to the nearby space. However, this transmitter design has one fundamental limitation. As shown in FIG. 3A, if the system 3001 is in the broadcasting mode while the system 3004 is in the listening mode, the magnetic field signal generated by the transmitter 3002 in the system 3001 will be poisoned by the secondary magnetic field emitted by the transmitter 3005 in the system 3004 due to magnetic induction effect. Considering the distance between transmitter 3005 and receiver 3006 is closer than that between transmitter 3002 and receiver 3006 in most cases, de-convolution of the poisoned signal is challenging, and this interference is so strong that it will cause the failure of communication between system 3001 and 3004.

Figure 4A:
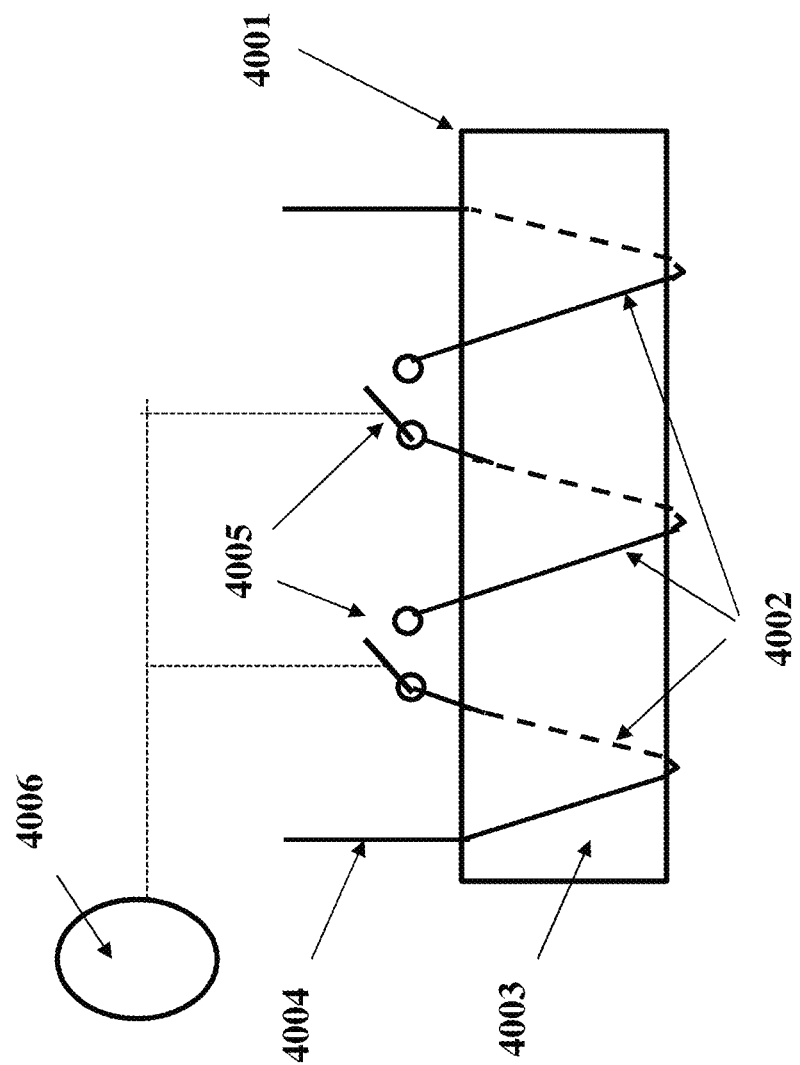
FIG. 4A one embodiment of the proposed transmitter designs to eliminate the induction current within the transmitter during listening mode of the system.

FIG. 4A illustrates one embodiment of the proposed transmitter designs to eliminate the induction current within the transmitter during listening mode. The key invention of the proposed transmitter design is to turn off synchronously the transmitter during listening mode. The transmitter is a solenoid 4001, comprising a coil 4002 and a soft magnetic core 4003, which boosts the emitted magnetic field. The working current of the transmitter is supplied through the coil lead 4004. Each turn of the coil 4002 links with a switch 4005. The switch 4005 is controlled by a switch controller 4006. Therefore, the ON/OFF of the transmitter is synchronized with the system's working mode by the switching controller 4006. The transmitter is turned OFF when the system is in listening mode. Hence, there is no secondary magnetic field generated by induction current to poison the incoming signal. On the other hand, the transmitter is turned ON when the system is in a broadcasting mode.

There are lots of design choices of switch 4005, such as RF microelectronic switches, microelectromechanical systems (MEMES) switches, switched capacitors, varactors, high-electron-mobility transistor (HEMT), field effect transistor (FET), and PIN diodes, etc. The rich varieties of the switch designs can be simply classified into two broad catalogs: one with mechanical moving parts; the other one without mechanical moving parts. However, the core of the invented transmitter design shown in FIG. 4A is synchronous control of the solenoid transmitter's ON/OFF with the system's working modes.

Figure 4B:
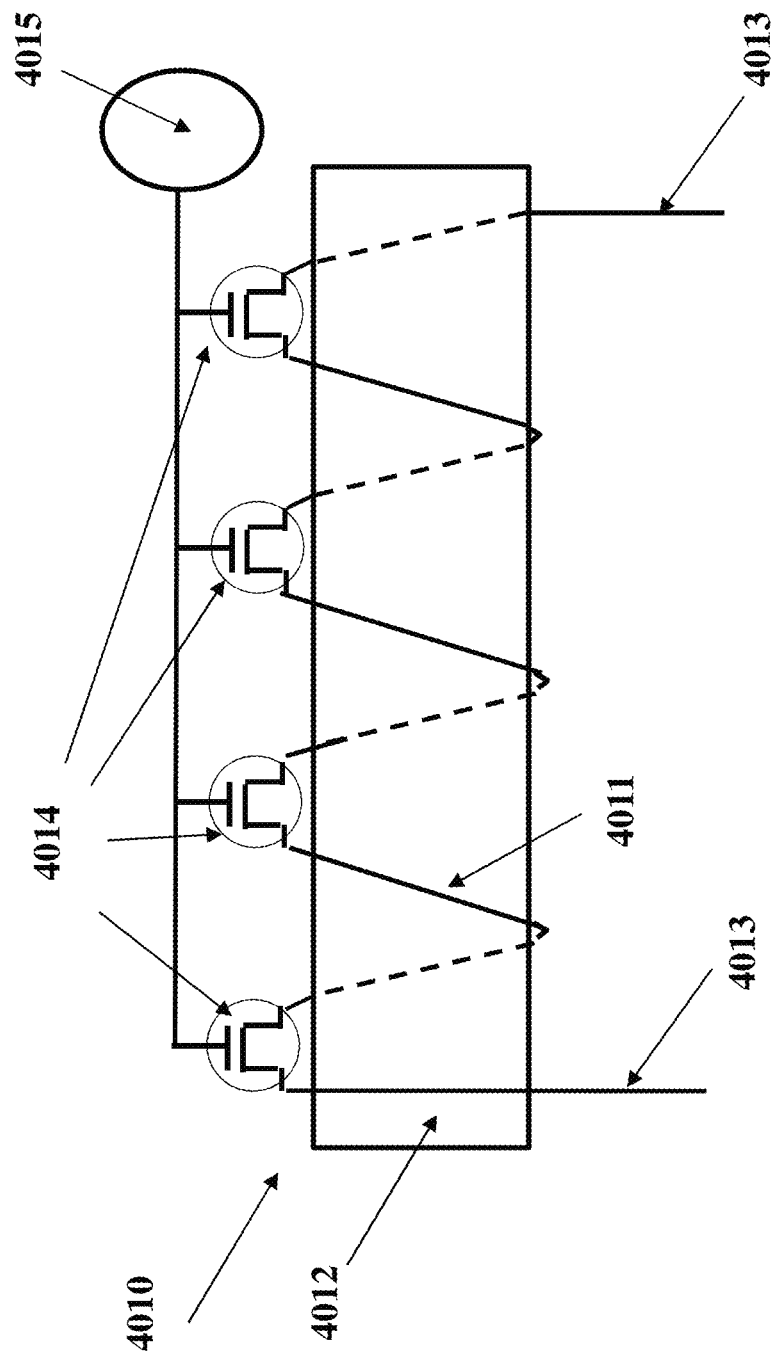
FIG. 4B one embodiment of the active control solenoid (for synchronous transmitting) designs, which has switches without moving parts.

FIG. 4B shows one embodiment of the active-synchronous-control solenoid designs, which has the switches without moving parts. As shown in FIG. 4B, the transmitter is an active-synchronous control solenoid 4010, comprising a coil 4011 and a soft magnetic core 4012. The working current of the solenoid 4010 is supplied through the coil lead 4013. Each turn of the coil 4011 links with a transistor 4014 that acts as switch. All transistors 4014 have a common gate configuration controlled by transistor controller 4015. Transistor controller 4015 will turn off the solenoid transmitter 4010 by switching off the transistors 4014 synchronously when the system works in listening mode to prevent induction current generation in coil 4011. Transistor controller 4015 will turn on the solenoid transmitter 4010 by switching on the transistors 4014 when the system works in broadcasting mode.

Figure 5A:
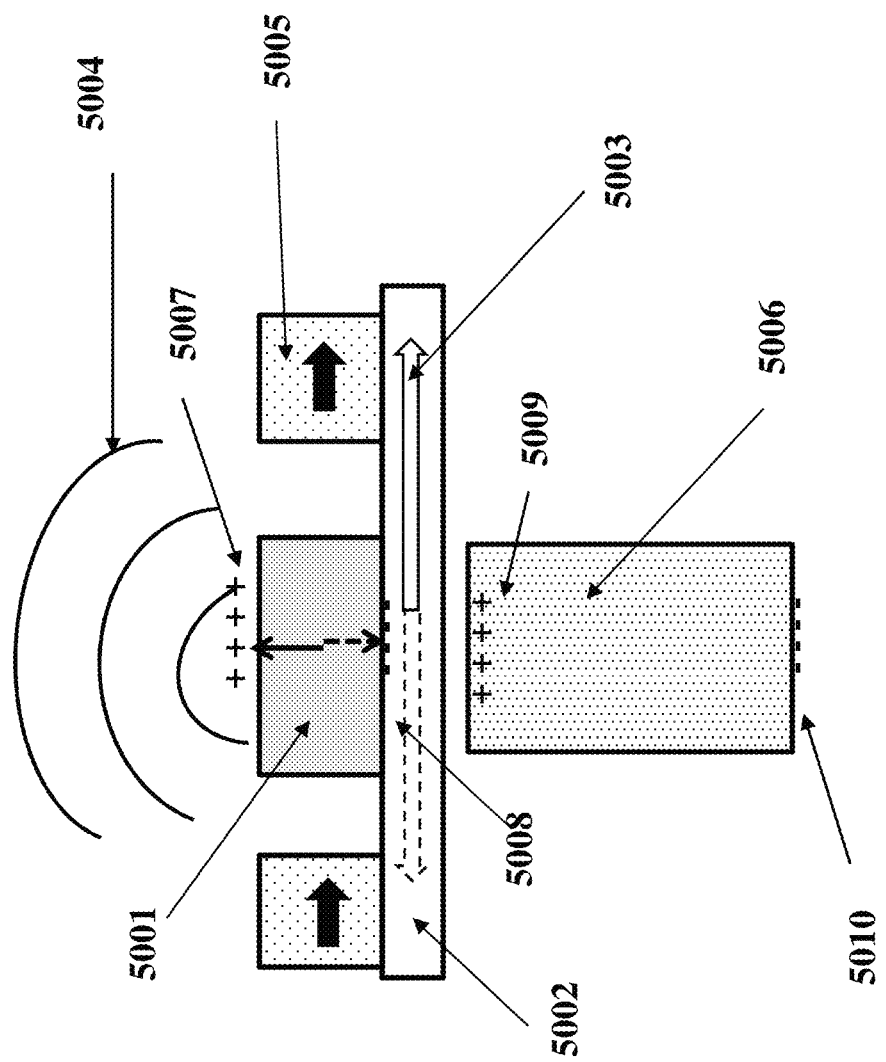
FIG. 5A one of the embodiments of the transmitter design based on the spin orbit torque (SOT), also called spin-orbit-coupling or spin-orbit interaction.

FIG. 5A illustrates one of the embodiments for the transmitter design based on the spin orbit torque (SOT), also called spin-orbit-coupling or spin-orbit interaction. As shown in FIG. 5A, the SOT transmitter comprises an active patterned magnetic element 5001 with perpendicular magnetization as shown by up-and-down arrows; a heavy metal lead 5002 below 5001, in which a driving current 5003 can be switched from left to right and (or) vice versa labeled by the arrows; a bias magnet 5005 providing in-plane bias field for active patterned element 5001; an optional but important soft-underlay structure 5006 to pull the magnetic charge 5007 and 5008 formed at the surface of the active element 5001 further apart via magnetic charge neutralization with charge 5009 and induced charge 5010. The soft-underlay structure 5006 enables the magnetic field 5004 generated by the active element 5001 to be broadcasted to longer distance in the free space. The direction of the driving current 5003 along with the material choice of the metal lead 5002 and bias field direction provided by bias magnet 5005 determinates the magnetization direction in the patterned element 5001 indicated by the up-and-down arrows in element 5001 due to the so-called SOT effects. The heavy metal lead 5002 can be made of Pt, β-W, β-Ta and other transition heavy metal with large spin Hall effects.

Figure 5B:
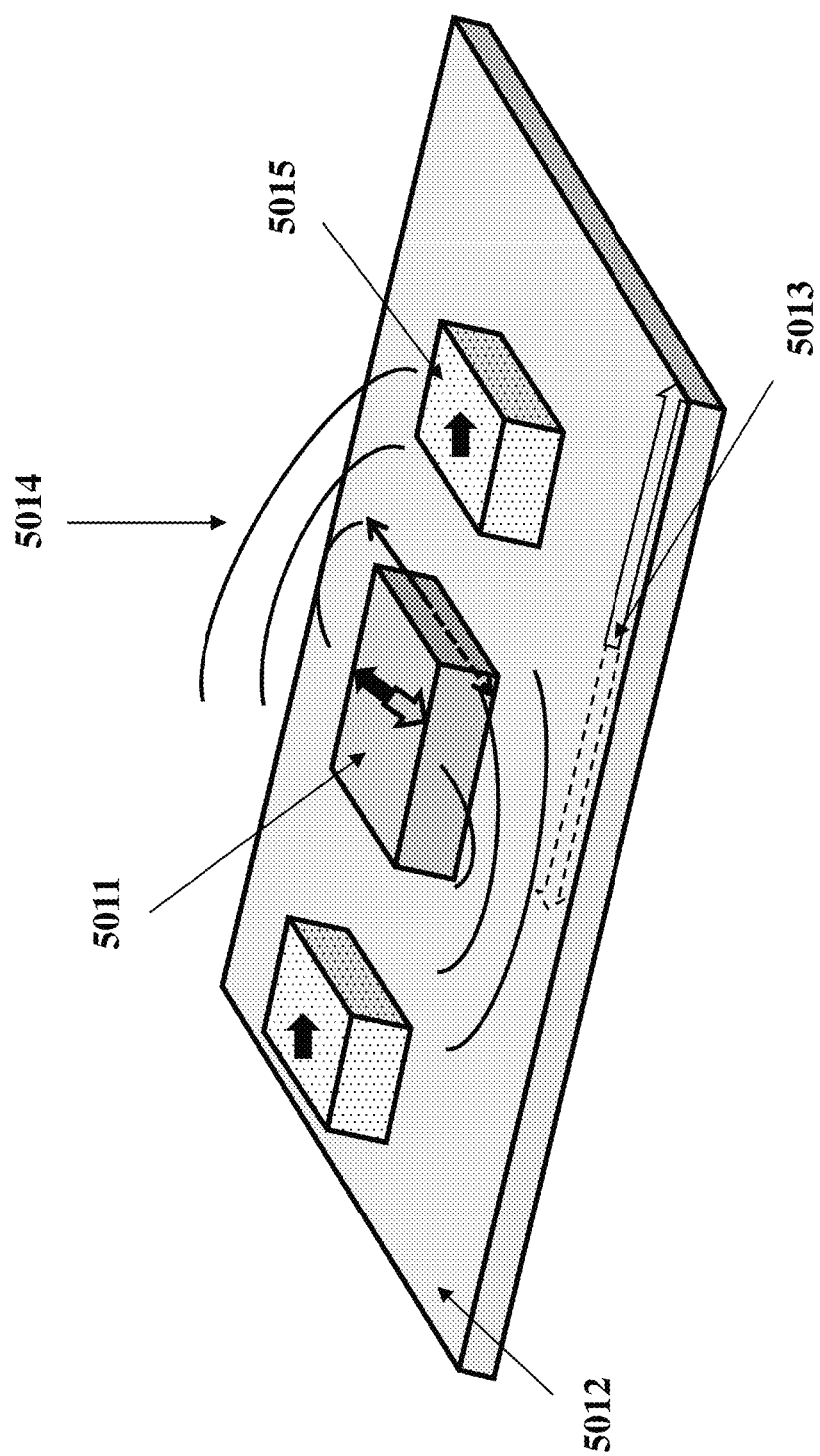
FIG. 5B one of the embodiments of the transmitter design based on the spin orbit torque (SOT).

FIG. 5B shows one of the embodiments of the transmitter design based on the spin orbit torque (SOT). As shown in FIG. 5B, the transmitter comprises an active patterned magnetic element 5011 with in-plane magnetization labeled by in-plane arrows; a heavy metal lead 5012 below 5011, in which a driving current 5013 can be switched from left to right and (or) vice versa; a bias magnet 5015 providing in-plane bias field for active patterned element 5011. The direction of the driving current 5013 along with the material choice of the metal lead 5012 and bias field direction provided by the bias magnet 5015 determinates the magnetization direction in the patterned element 5011 indicated by the arrows in the element 5011 due to the so-called SOT effects. The heavy metal lead 5012 can be made of Pt, β-W, β-Ta and other transition heavy metal with large spin Hall effects.

Figure 6A:
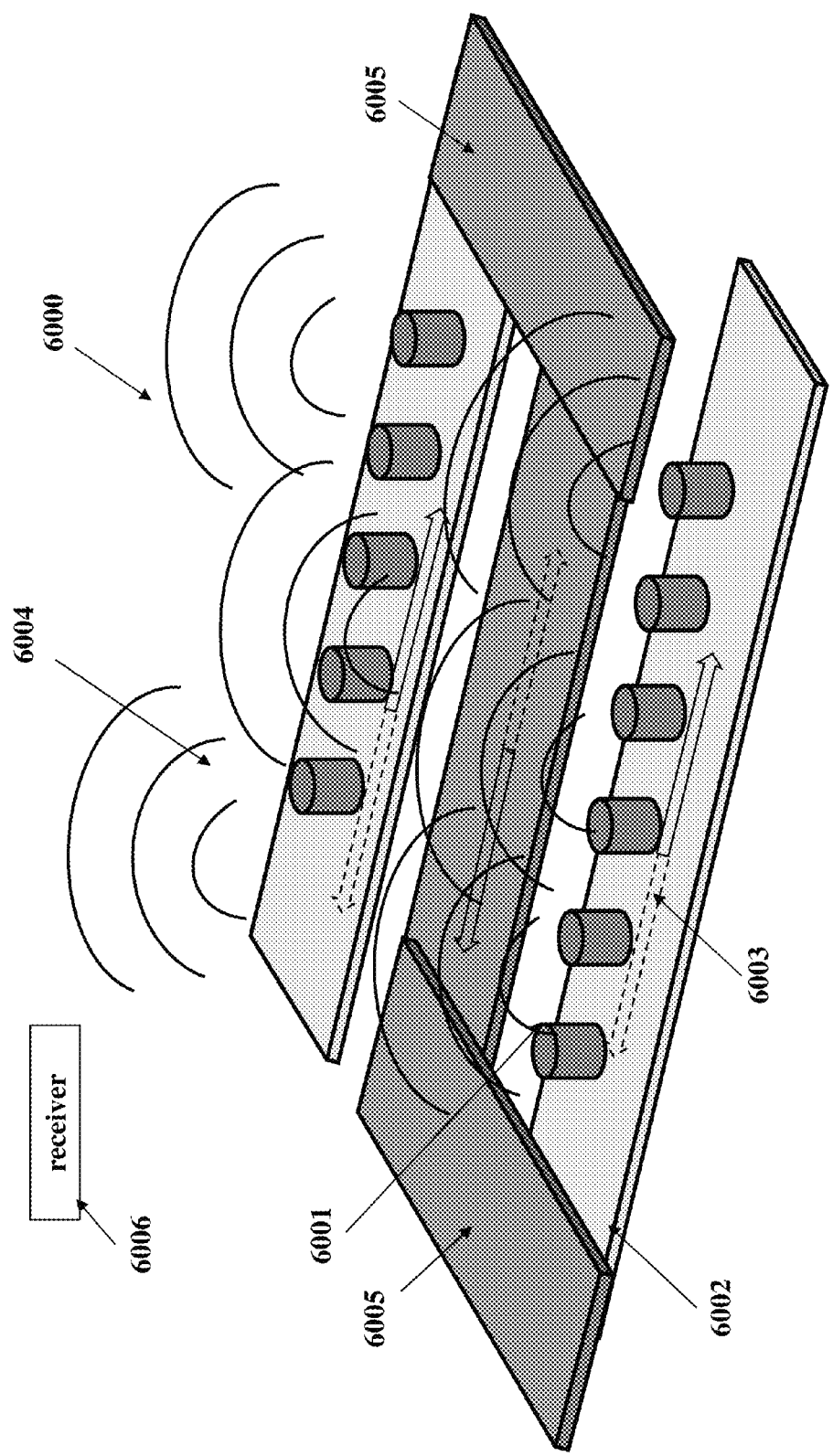
FIG. 6A one of the embodiments of wide lateral range transmitter design—array of patterned SOT elements similar to what is shown in FIG. 5A.

FIG. 6A shows one of the embodiments of the wide lateral range transmitter design 6000 using array of individual transmitters 6001 shown in FIG. 5A (the transmitter shown in FIG. 5B can also be used in the similar fashion, which is not shown here). The driving current leads 6002 shown in FIG. 6A in light gray color is made of heavy metal such as Pt, β-W, β-Ta and other transition heavy metal with large spin Hall effects. The magnetization of the array of individual transmitters 6001 sitting on driving current leads 6002 is controlled by the driving current direction 6003 in leads 6002. In order to synchronize all the individual transmitters 6001 by using one driving current; as well as simplify the array manufacture process, two neighbor driving current leads 6002 are linked together by a high conductivity metal lead 6005 to form an "S" shape lead arrangement shown in FIG. 6A. Hence, driven by one current, the array of individual transmitters 6001 will generate synchronized magnetic fields. The superposition of all synchronized magnetic fields forms the broadcasting magnetic field 6004, which has wide lateral coverage without significant increase of the driving current, making the paring system's receiver 6006 easily pick up the broadcasting signal with good quality under the conditions of loose alignment to the transmitter array.

Figure 6B:
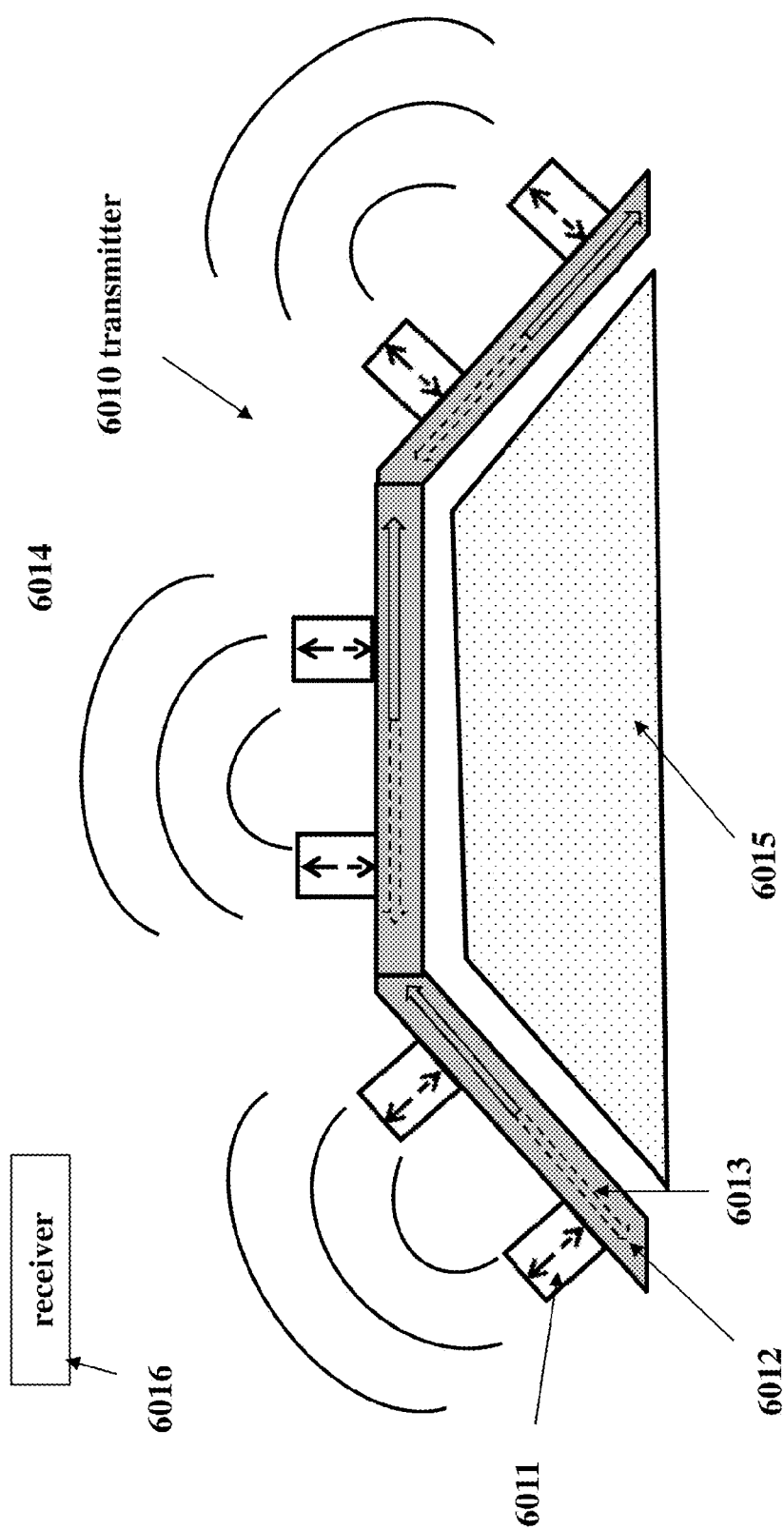
FIG. 6B one embodiment of multiple transmitters' hemispheric uniform coverage design.

FIG. 6B shows a hemispheric uniform coverage transmitter configuration 6010 made of multiple transmitters 6011 with patterned switchable elements on the side and top surfaces of a square frustum, which can reduce the angle sensitivity of the pairing system's receiver (sensor) 6016 relatively oriented to the transmitter 6010. Both the transmitters shown in FIG. 5A and FIG. 5B can be used to make transmitter configuration 6010. As shown in FIG. 6B, array of transmitters 6011 with patterned magnetic elements are arranged on the side and top surfaces of the square frustum feature 6015 directly sitting on the heavy metal leads 6012, which carries the driving current 6013. The magnetization of the patterned magnetic elements in transmitter 6011 follows the direction of driving current 6013. This configuration provides hemispheric uniform coverage of the magnetic field 6014 broadcasted by the transmitter, and make the paring system's receiver 6016 less sensitive to the orientation relative to transmitter 6010. The lead 6012 is made of heavy metal such as Pt, β-W, β-Ta and other transition heavy metal with large spin Hall effects.

Figure 7A:
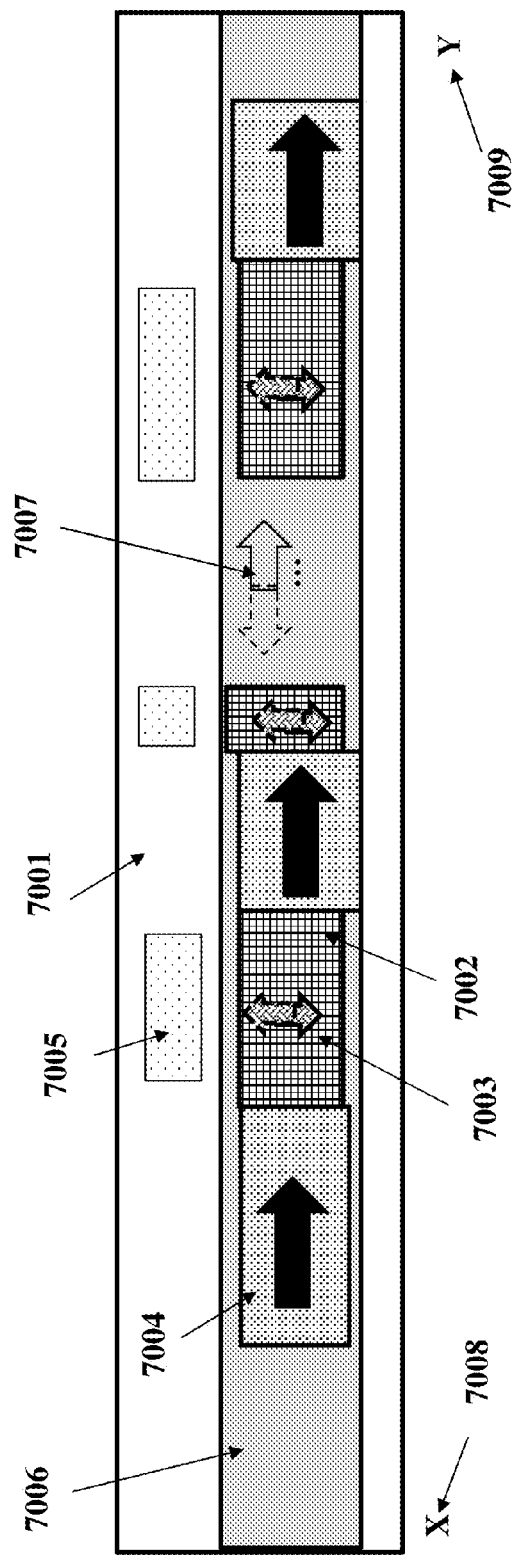
FIG. 7A one embodiment of array of transmitters shown in FIG. 5B with patterned switchable elements on a flexible substrate.
Figure 7B:
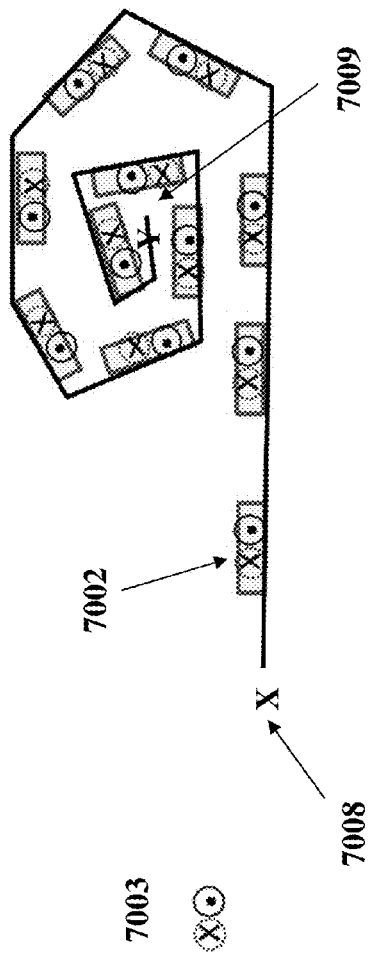
FIG. 7B the cross section view of the array of transmitters on rolled substrate.

FIG. 7A shows one of embodiments of transmitter designs on the flexible substrate using array of transmitters shown in FIG. 5B with patterned switchable elements. FIG. 7B is the cross section view of the array of transmitters on the rolled substrate. As shown in FIG. 7A, the patterned magnetic elements 7002 directly connect to the heavy metal lead 7006, which is laid on the flexible substrate 7001 and made of heavy metal such as Pt, β-W, β-Ta or other transition heavy metal with large spin Hall effects. The magnetization 7003 of the patterned magnetic elements 7002, marked by the arrows, can be flipped by the driving current 7007 in the lead 7006. The bias magnet 7004 provides an in-plane bias magnetic field to the patterned magnetic element 7002. The soft magnetic feature 7005 on the back of pattern magnetic element 7002 is an optional design, but useful to reduce the demagnetic field of the patterned magnetic element 7002 similar to the function of the soft-underlay structure 5006 in FIG. 5A. The two ends 7008 and 7009 of the flexible substrate are marked as X and Y, respectively. Shown in FIG. 7B, the end 7008 (Mark X) is on the outside of the rolled substrate, and the end 7009 (Mark Y) is at the center of the rolled substrate. The driving current 7007 is supplied to the rolled transmitter via both ends of 7008 (Mark X) and 7009 (Mark Y).

Figure 8:
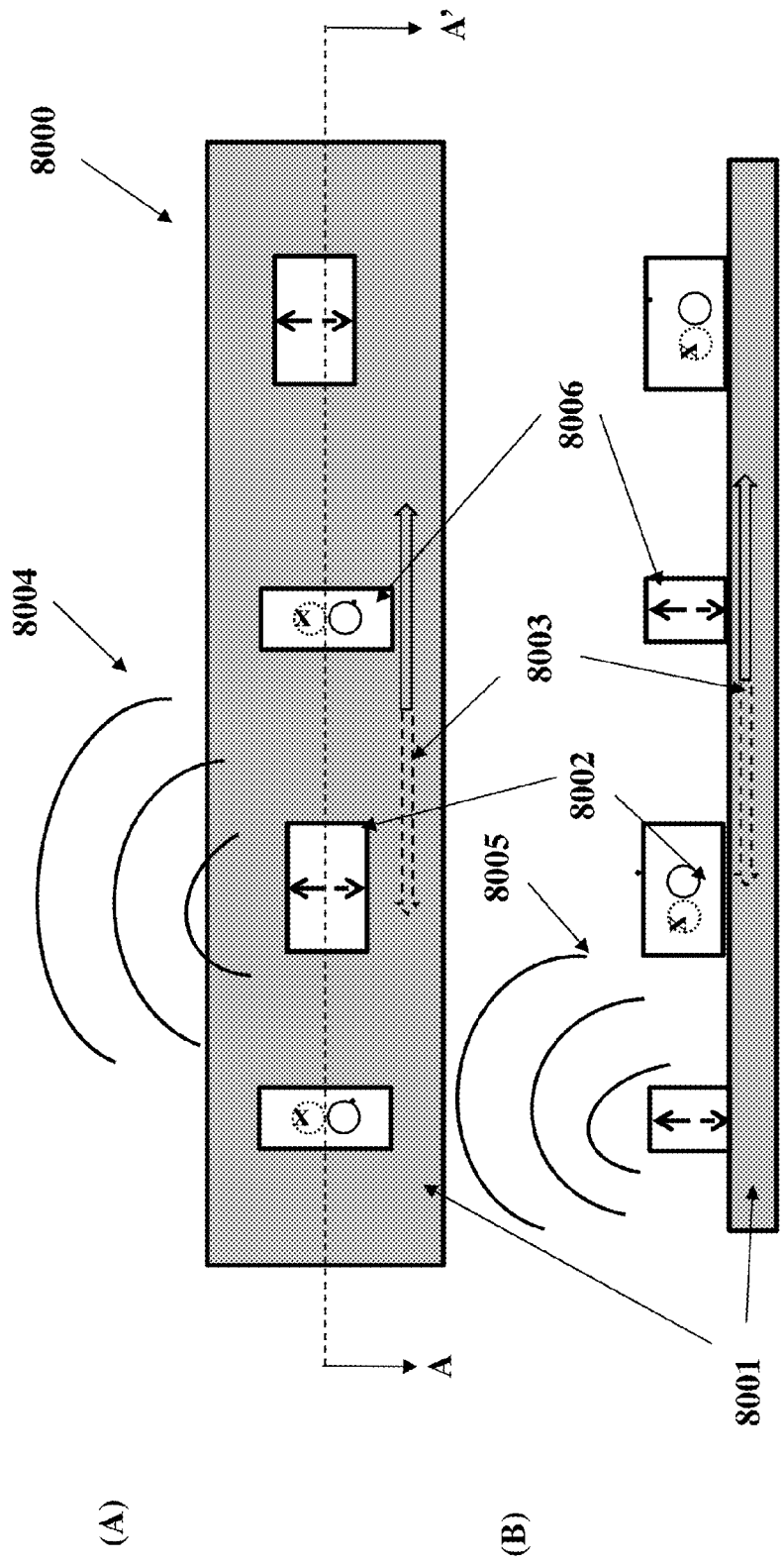
FIG. 8 one embodiment of array of mixed transmitters shown in FIG. 5A and FIG. 5B with different magnetization orientation (either in-plane or out-of-plane)—(A) the bird eye view; (B) cross sectional view along A-A' cut.

FIG. 8 illustrates transmitter design with array of mixed transmitters shown in FIG. 5A and FIG. 5B with different magnetization orientation (either in-plane or out-of-plane)— (A) the bird eye view; (B) cross section view along A-A' cut. As shown in FIG. 8, the new transmitter 8000 comprises heavy metal leads 8001, over which there are two kinds of patterned magnetic elements 8006 and 8002 shown in FIG. 5A and FIG. 5B, respectively. For the sake of simplicity, the bias hard magnets shown in FIG. 5A and FIG. 5B are not shown here. The magnetizations of the patterned elements 8002 and 8006, which generate the emitted magnetic field 8004 and 8005, respectively, can be switched by the driving current 8003 in heavy metal lead 8001 according with the code information. This design makes the emitted magnetic field cover two orthogonal directions thus remarkably reduce the orientation alignment requirement between the transmitter and the receiver in its pairing system.

What is claimed is:
1. A wireless communication system comprises at least:
  a solenoid coil, each turn of which links to a switch controlled by a common control-switch, acting as a transmitter and being capable of broadcasting information-coded magnetic field in the space around it;
  A receiver capable of sensing the magnetic field;
  Electronics for controlling or/and driving said transmitter and said receiver.
2. The system of claim 1, wherein said wireless communication system further comprises a software application, at least, to allow the user of the system to choose file to send through the system.
3. The system of claim 1, wherein said receiver comprises a solid magnetic field sensor based on either Hall effect; or magnetic impedance (MI) effect; or magnetoresistive technology including AMR, or GMR, or TMR.
4. The system of claim 1, wherein said switch controlled by a common control-switch is a mechanical switch with moving parts.
5. The system of claim 4, wherein said mechanical switch with moving parts is a MEMS device capable of volume production using wafer processes.
6. The system of claim 1, wherein said switch controlled by a common control-switch is a FET or HEMT transistors in common gate configuration.
7. The system of claim 1, wherein said switch controlled by a common control-switch is a PIN diode.
8. A wireless near field communication system comprises at least:

a transmitter comprising one or an array of patterned magnetic element(s), sandwiched between either a dielectric layer, and a heavy metal layer, in which an alternating current is larger enough to flip the magnetization of the magnetic element(s) due to spin-orbit torque effect to broadcast information-coded magnetic field in the space around said patterned magnetic element(s);

A receiver capable of sensing the magnetic field;

Electronics for controlling or/and driving said transmitter and said receiver.

9. The system of claim 8, wherein said heavy metal layer is made of Pt, or W (β-W), or Ta (β-Ta), or metals showing large Spin Hall effects, or alloy between the above mentioned metals and Cu, or Al.

10. The system of claim 8, wherein said patterned magnetic element(s) has(have) either perpendicular, or in-plane magnetization orientation.

11. The system of claim 8, wherein said patterned magnetic element(s) has a bias magnetic field provided by hard magnet(s) placed closely.

12. The system of claim 8, wherein said patterned magnetic element(s) has a soft magnetic feature placed close to it for reducing the de-magnetic field so that the magnetic field emitted from the patterned magnetic element(s) capable of reach longer broadcasting distance.

13. The system of claim 8, wherein said array of patterned magnetic elements is placed over specifically arranged leads, made of said heavy metal layer, having highly conductive connections between them so that one driving current is used to drive all elements working synchronically to extend magnetic field coverage lateral.

14. The system of claim 8, wherein said array of patterned magnetic elements is made over said heavy metal layer placed at least on two slopes with different orientation in order to cover wider emitting solid angle.

15. The system of claim 8, wherein said array of patterned magnetic elements over a heavy metal layer is made on a flexible substrate, then fabricated into a roll to enhance the field strength in the direction along the axis of the roll to extend the field range and lateral coverage.

16. The system of claim 8, wherein said patterned magnetic elements, being switchable via a single alternating current, have mixed magnetization orientations—some having in-plane, the other having out-of-plane magnetization orientation.

17. The system of claim 8, wherein said wireless near field communication system is built either as a standalone or built-in system for communication between devices or modularized components of a system.

18. The system of claim 8, wherein said wireless near field communication system is used to establish an off-the-grid localized communication network for data sharing or passing.

19. The system of claim 8, wherein said wireless near field communication system equips with multiple transceivers to either form multiple information channels or dual-direction data transfer at the same time.

* * * * *